(12) United States Patent
Yildiz et al.

(10) Patent No.: US 11,165,583 B2
(45) Date of Patent: *Nov. 2, 2021

(54) MULTI-FACTOR AUTHENTICATION IN VIRTUAL, AUGMENTED, AND MIXED REALITY (XR) APPLICATIONS

(71) Applicant: Dell Products, L.P., Round Rock, TX (US)

(72) Inventors: Yagiz Can Yildiz, Austin, TX (US); Daniel L. Hamlin, Round Rock, TX (US); Fernando L. Guerrero, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/669,782

(22) Filed: Oct. 31, 2019

(65) Prior Publication Data
US 2020/0067710 A1 Feb. 27, 2020

Related U.S. Application Data

(63) Continuation of application No. 15/634,828, filed on Jun. 27, 2017, now Pat. No. 10,536,273.

(51) Int. Cl.
*H04L 9/00* (2006.01)
*H04L 9/32* (2006.01)
*G06F 21/32* (2013.01)
*H04L 29/06* (2006.01)
*H04L 9/14* (2006.01)
*H04L 9/30* (2006.01)
*G06K 9/00* (2006.01)
*H04W 4/80* (2018.01)
(Continued)

(52) U.S. Cl.
CPC ............ *H04L 9/3228* (2013.01); *G06F 21/32* (2013.01); *G06F 21/41* (2013.01); *G06K 9/00013* (2013.01); *G06K 9/00604* (2013.01); *H04L 9/006* (2013.01); *H04L 9/14* (2013.01); *H04L 9/30* (2013.01); *H04L 9/3231* (2013.01); *H04L 63/0815* (2013.01); *H04L 63/0838* (2013.01); *H04L 63/0861* (2013.01); *H04W 4/80* (2018.02); *H04W 12/068* (2021.01); *H04W 12/069* (2021.01); *G06K 9/00892* (2013.01); *H04L 2463/082* (2013.01); *H04W 84/12* (2013.01)

(58) Field of Classification Search
CPC ....... G06F 21/32; G06F 21/41; H04L 9/3228; H04L 9/30; H04L 9/14; H04L 9/3231
See application file for complete search history.

(56) References Cited

U.S. PATENT DOCUMENTS

10,078,867 B1  9/2018  Chan et al.
10,536,273 B2 * 1/2020  Yildiz ................ G06K 9/00013
(Continued)

*Primary Examiner* — Beemnet W Dada
(74) *Attorney, Agent, or Firm* — Fogarty LLP (57) ABSTRACT

Systems and methods for multi-factor authentication in virtual, augmented, and mixed reality (xR) applications are described. In some embodiments, an xR headset may include a processor and a memory coupled to the processor, the memory comprising program instructions stored thereon that, upon execution, cause the xR headset to: authenticate a user wearing the xR headset, and, in response to the authentication, log the user into an Information Handling System (IHS) distinct from the xR headset.

20 Claims, 5 Drawing Sheets

(51) Int. Cl.
  *G06F 21/41* (2013.01)
  *H04W 12/06* (2021.01)
  *H04W 12/069* (2021.01)
  *H04W 84/12* (2009.01)

(56) References Cited

U.S. PATENT DOCUMENTS

2006/0116107 A1 6/2006 Hulvey
2017/0324726 A1 11/2017 Alleaume et al.
2018/0124599 A1 5/2018 Werner et al.
2018/0150899 A1 5/2018 Waldron et al.
2018/0176215 A1 6/2018 Perotti et al.

* cited by examiner

MULTI-FACTOR AUTHENTICATION IN VIRTUAL, AUGMENTED, AND MIXED REALITY (XR) APPLICATIONS

CROSS-REFERENCE TO RELATED APPLICATIONS

This specification claims the benefit of the filing date of U.S. patent application Ser. No. 15/634,828, which is titled "MULTI-FACTOR AUTHENTICATION IN VIRTUAL, AUGMENTED, AND MIXED REALITY (xR) APPLICATIONS" and was filed on Jun. 27, 2017 the disclosure of which is hereby incorporated by reference herein in its entirety.

FIELD

The present disclosure generally relates to Information Handling Systems (IHSs), and, more particularly, to systems and methods for multi-factor authentication in virtual, augmented, and mixed reality (collectively referred to as "xR") applications.

BACKGROUND

The goal of virtual reality (VR) is to immerse users in virtual environments. A conventional VR device obscures a user's real-world surroundings, such that only digitally-generated images remain visible. Those images are presented on a display such as, for example, an organic light-emitting diode (OLED) panel housed within a wearable head-mounted device (HMD) or the like. In contrast with VR, augmented reality (AR) and mixed reality (MR) operate by overlaying digitally-generated content or entities (e.g., characters, text, hyperlinks, images, graphics, etc.) upon the user's physical surroundings. A typical AR/MR device includes a projection-based optical system that displays content on a translucent or transparent surface (e.g., plastic, glass, etc.) of an HMD, heads-up display (HUD), eyeglasses, or the like (collectively referred to as "xR headsets" or "headsets").

Certain xR headsets utilize biometric technologies to authenticate an authorized user locally on that specific headset. The inventors hereof have recognized, however, that an xR headset may also be used as a "key" to log into other, external computing devices in communication with the xR headset, such as a desktop or a notebook. Moreover, when an xR headset communicates with an external computing device using a wireless protocol, simply being within range of the external device does not mean that the user is allowed or wishes to log onto that device. Accordingly, the inventors hereof have also recognized a need for secure key generation, unlocking, and/or transfer between xR headsets and other computing devices.

SUMMARY

Embodiments of systems and methods for multi-factor authentication in virtual, augmented, and mixed reality (xR) applications are described. In an illustrative, non-limiting embodiment, an xR headset may include a processor and a memory coupled to the processor, the memory comprising program instructions stored thereon that, upon execution, cause the xR headset to: authenticate a user wearing the xR headset, and, in response to the authentication, log the user into an Information Handling System (IHS) distinct from the xR headset.

In some cases, to authenticate the user, the program instructions, upon execution, further cause the xR headset to match a biometric sample obtained from the user against stored biometric information of the user. For example, the biometric sample may be an iris, retina, or fingerprint sample.

To log the user into the IHS, the program instructions may cause the xR headset to: receive an authentication request from the IHS, retrieve a private key from the memory, and transmit a response to the authentication request, such that the response is encrypted with the private key. Additionally or alternatively, to log the user into the IHS, the program instructions may cause the xR headset to: receive a One-Time Password (OTP) from the IHS such that the OTP is encrypted with a public key paired to the private key, decrypt the OTP using the private key, and log the user into the IHS with the OTP.

The xR headset may also include a display and, to log the user into the IHS, the program instructions may cause the xR headset to show an image to the user indicative of the OTP via the display. Additionally or alternatively, the xR headset may include a speaker and, to log the user into the IHS, the program instructions may cause the xR headset to play a sound to the user indicative of the OTP via the speaker.

In other embodiments, a hardware memory storage device may have program instructions stored thereon that, upon execution by a processor of a headset, cause the headset to authenticate a first user wearing the headset and, in response to the authentication, log a second user into an IHS distinct from the headset.

To authenticate the first user, the program instructions may cause the headset to match a biometric sample obtained from the first user against stored biometric information of the first user. To log the second user into the IHS, the program instructions may cause the headset to: receive an authentication request from the IHS; retrieve a private key from the memory; transmit a response to the authentication request, such that the response is encrypted with the private key, receive an OTP from the IHS, such that the OTP is encrypted with a public key paired to the private key, and decrypt the OTP using the private key.

To authenticate the second user, the program instructions may cause the headset to authenticate the first user in response to a request initiated by the second user operating the IHS. Additionally or alternatively, to authenticate the second user, the program instructions may cause the headset to perform a plurality of authentication operations and, upon failure of at least one of the authentication operations, log the second user out of the IHS.

In yet other embodiments, a method may include authenticating, by a headset, a user wearing the headset and, in response to the authentication, providing access to an IHS distinct from the headset. In some implementations, authenticating may include matching a biometric sample obtained from the user against stored biometric information of the user. The biometric sample may be an iris, retina, or fingerprint sample.

Providing access to the IHS may include receiving an authentication request from the IHS, retrieving a private key from the memory, and transmitting a response to the authentication request, wherein the response is encrypted with the private key. Additionally or alternatively, providing access to the IHS may include receiving an OTP from the IHS, wherein the OTP is encrypted with a public key paired to the private key, decrypting the OTP using the private key, and using the OTP to log the user into the IHS. Additionally or alternatively, providing access to the IHS may include receiving an OTP from the IHS, such that the OTP is encrypted with a public key paired with the private key, decrypting the OTP using the private key, and logging another user into the IHS with the OTP.

The headset may include a display, and providing access to the IHS may include causing the headset to show an image to the user indicative of the OTP via the display. Additionally or alternatively, the headset may include a speaker, and providing access to the IHS may include causing the headset to play a sound to the user indicative of the OTP via the speaker.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein provide systems and methods for multi-factor authentication in virtual, augmented, and mixed reality (collectively referred to as "xR") applications. These systems and methods are particularly useful in xR applications that employ head-mounted devices (HMDs), Heads-Up Displays (HUDs), eyeglasses, or the like (collectively referred to as "xR headsets" or simply "headsets").

In various embodiments, a user is authenticated to operate an xR headset by providing a biometric sample (e.g., retina, iris, voice, etc.) to that headset, and then the headset locally determines whether the user is authorized to operate it. After local authentication, the xR headset may itself be used as a personal key to enable the user log into other Information Handling Systems (IHSs) devices, such as desktops, notebooks, tablets, or the like. In many implementations, techniques for secure key generation, unlocking, and transfer operations between the xR headset and the other IHS render the process unspoofable.

An xR headset, as described herein, may be implemented as a peripheral device with a corresponding software application that provide secure and intuitive user authentication with respect to another IHS. For example, an xR headset may contain, among other components, a display for user inspection, secure storage for key storage, a processor or controller to handle communications between the xR headset and another IHS, and an iris and/or retina camera (e.g., video, infrared, etc.) that may be used for close user authentication.

One or more users may be biometrically enrolled in the xR headset. Once the xR headset locally authenticates a user based upon their biometric enrollment, the xR headset may display a One-Time Password (OTP), to be entered onto another IHS, for the same (or another) user to login into the other IHS.

As such, systems and methods described herein provide techniques for multi-factor authentication that ensure continuity of authentication flow as well as multi-factor usage. Particularly, these techniques may enable device continuity (e.g., Bluetooth connectivity), user continuity (e.g., glass state detection mechanism), secure communications between a resource device or IHS, the user, or an associated xR headset, and/or transport mechanisms with a replayable protected credential for user authorization.

In some implementations, a number of security features may be implemented. For example, in some cases, biometric credentials may only be stored on the xR headset's memory, and local enrollment and authentication may be fully contained within the xR headset. Key databases may be managed locally and/or remotely. Communications between the xR headset and other IHSs may be secured by Transport Layer Security (TLS) and/or asymmetric encryption.

A One-Time Password (OTP) generation and authentication process may be initiated, in some cases, only after the xR headset successfully performs local authentication of the user, for example, using retina, iris, voice, or face recognition. The application may then further generate a new challenge response procedure to initiate authentication into another IHS on demand (e.g., device unlock, persistent authentication, step-up authentication, etc.).

Figure 1:
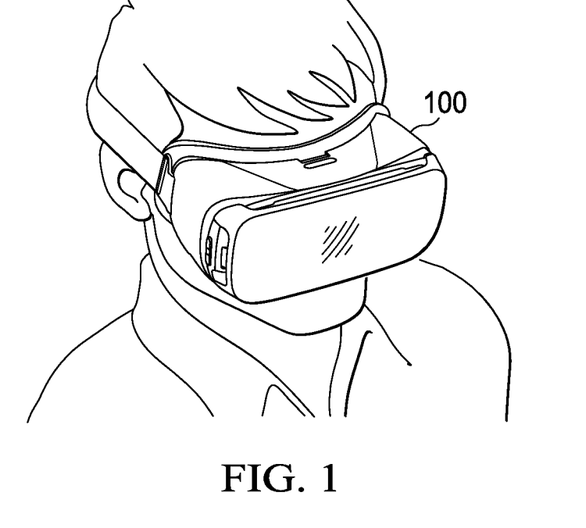
FIG. 1 shows a perspective view of a non-limiting example of a headset used in a virtual, augmented, or mixed reality (xR) application according to some embodiments
Figure 2:
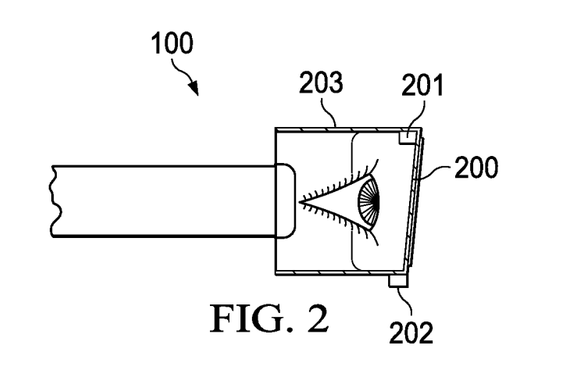
FIG. 2 shows a cross-sectional view of the xR headset according to some embodiments.

FIG. 1 illustrates xR headset 100, and FIG. 2 is a cross-section view of xR headset 100 configured to implement multi-factor authentication in xR applications according to some embodiments. As shown, a user wears xR headset 100 around their head and over their eyes, such that the user can see their physical environment via a see-through display system, glass, and/or lens 200 ("display") mounted on headset frame or body 203.

In some cases, a layer of polarizing material may be incorporated into display 200 to control the amount of external light reaching the user's eyes. Moreover, xR headset 100 may include one or more transparent or translucent Organic Light-Emitting Diode (OLED) displays having one or more flexible sheets of organic electroluminescent material. Additionally or alternatively, transparent OLEDs may be replaced with an optical projector device aimed at a projection glass or the like.

In some implementations, a first display portion may be disposed in front of the user's right eye, and a second display portion may be disposed in front of the user's left eye. Alternatively, a single display may be used for both eyes.

Display(s) 200 may show information in the form of digital entities (e.g., characters, text, hyperlinks, images, graphics, etc.) overlaying a visible, physical environment in the user's field of view. In some cases, these digital entities may be relevant to a physical object located within the environment and recognized by the xR headset using a learning machine algorithm implemented using a front-facing camera. Additionally or alternatively, display(s) 200 may completely immerse the user is a purely virtual, digital environment, such that, for practical purposes, the physical environment is no longer visible to the user.

In various embodiments, xR headset 100 may include any number of sensors. internal sensor 201 (internal) and external sensor 202 are shown in this example. Generally speaking, sensors 201 and 202 may include sensors such as, for example: microphones, speakers, photoelectric sensors, piezoelectric transducers, position/velocity/acceleration sensors, temperature sensors, proximity sensors, touch sensors, cameras, ultrasonic sensors, radio frequency (RF) antennas, and biometric sensors (e.g., pupil, iris, or retina scanners, fingerprint sensors, etc.), among others.

In some cases, internal sensor 201 may be an inward-facing camera (e.g., an infrared or video camera) mounted onto headset body 203 and aimed at the user's eye. In other implementations, two inward-facing cameras may be used, one on each side of body 203, each inward-facing camera aimed at a respective eye.

In other cases, internal sensor 201 may be an inward-facing camera and external sensor 202 may be a fingerprint scanner. When the user touches sensor 202 on frame 203, xR headset 101 may be configured to perform a biometric validation of the user's fingerprint in addition or as an alternative to internal sensor 201's iris or retina authentication.

Figure 3:
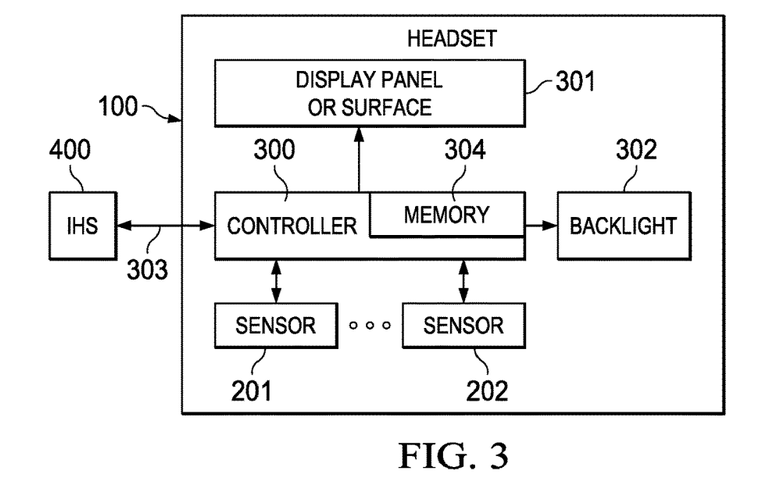
FIG. 3 is a block diagram of non-limiting examples of xR headset components according to some embodiments.

FIG. 3 illustrates components of xR headset 100 according to some embodiments. As depicted, controller 300 includes hardware memory storage device 304 having program instructions stored thereon that, upon execution by controller 300, cause xR headset 100 to create and/or display an all-immersive virtual environment; and/or to overlay digitally-created content or images on panel or surface 301 (e.g., an LCD panel, an OLED film, a projection surface, etc.) in place of and/or in addition to the user's natural visual perception of the real-world.

As such, controller 300 drives panel or surface 301 and/or backlight 302 (e.g., an LED light) of display 200 in order to provide the user with a visual xR experience. Moreover, controller 300 may employ sensors (not shown) to implement a number of tracking techniques usable in the rendering of the xR images (e.g., the user's own location, head position, etc.), and/or to change one or more aspects of xR headset 101's display 102 and/or digitally-created content or images (e.g., relative size of other entities, perspective, field of view, etc.).

In some implementations, controller 300 may communicate with external IHS 400 via wired or wireless connection 303 (e.g., USB, Wi-Fi, Bluetooth, etc.), which allows IHS 400 setting to change aspects of HMD 100's display 200. Moreover, communications between xR headset and IHS 400 over connection 303 also enables cooperation between the two devices in implementing systems and methods for multi-factor authentication in xR applications, as described herein.

It should be noted FIG. 3 shows only portions of xR headset 100 that are relevant for understanding the systems and methods described herein. Yet, it also should be noted that, in various implementations, power and other components may be present. Moreover, in some cases, xR headset 100 may itself be an instance of an IHS, such that one or more elements of IHS 400 may be built onto body 203 of xR headset 100.

Figure 4:
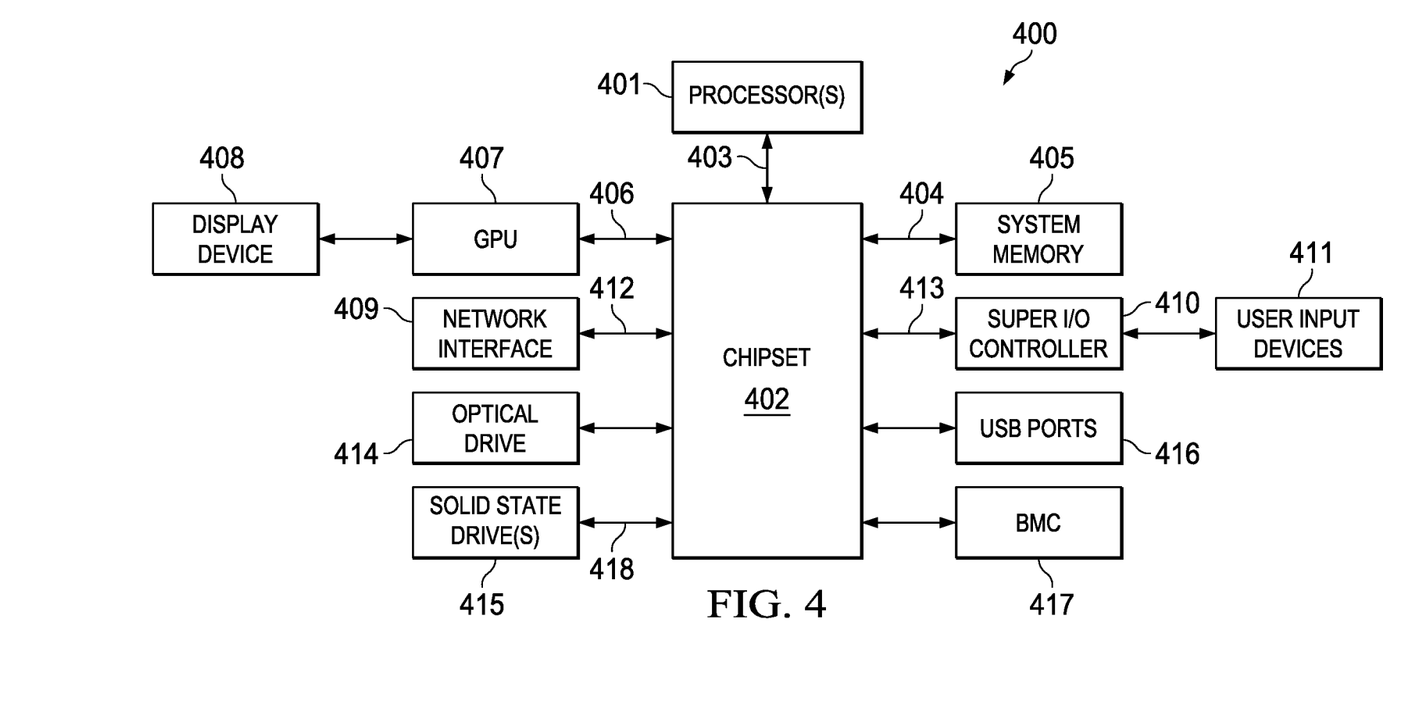
FIG. 4 is a block diagram of non-limiting examples of information handling system (IHS) components according to some embodiments.

FIG. 4 illustrates IHS 400 configured to implement multi-factor authentication in xR applications according to some embodiments. In some cases, xR headset 100 may include IHS 400 or component(s) thereof. Additionally or alternatively, IHS 400 may be used as an external device in wired or wireless communication with xR headset 100.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

As shown in the implementation of FIG. 4, IHS 400 may include one or more processors 401. In various embodiments, IHS 400 may be a single-processor system including one processor 401, or a multi-processor system including two or more processors 401. Processor(s) 401 may include any processor capable of executing program instructions, such as any general-purpose or embedded processor implementing any of a variety of Instruction Set Architectures (ISAs).

IHS 400 comprises chipset 402 that may include one or more integrated circuits that are connected to processor(s) 401. In certain embodiments, chipset 402 may utilize a QPI (QuickPath Interconnect) bus 403 for communicating with the processor(s) 401. Chipset 402 provides the processor(s) 401 with access to a variety of resources. For instance, chipset 402 provides access to system memory 405 over memory bus 404. System memory 405 may be configured to store program instructions and/or data accessible by processors(s) 401. In various embodiments, system memory 405 may be implemented using any suitable memory technology, such as static RAM (SRAM), dynamic RAM (DRAM) or nonvolatile/Flash-type memory.

Chipset 402 may also provide access to Graphics Processing Unit (GPU) 407. In certain embodiments, graphics processor 407 may be comprised within one or more video or graphics cards that have been installed as components of IHS 400. Graphics processor 407 may be coupled to the chipset 402 via graphics bus 406 such as provided by an AGP (Accelerated Graphics Port) bus or a PCIe (Peripheral Component Interconnect Express) bus. In certain embodiments, GPU 407 generates display signals and provides them to xR headset 100 (or any other display device 408).

In certain embodiments, chipset 402 may also provide access to one or more user input devices 411. In such embodiments, chipset 402 may be coupled to a super I/O controller 410 that provides interfaces for a variety of user input devices 411, in particular lower bandwidth and low data rate devices.

For instance, super I/O controller 410 may provide access to a keyboard and mouse or other peripheral input devices. In certain embodiments, super I/O controller 410 may be used to interface with coupled user input devices 411 such as keypads, biometric scanning devices, and voice or optical recognition devices. These I/O devices may interface with super I/O controller 410 through wired or wireless connections. In certain embodiments, chipset 402 may be coupled to super I/O controller 410 via Low Pin Count (LPC) bus 413.

Other resources may also be coupled to processor(s) 401 of IHS 400 through chipset 402. In certain embodiments, chipset 402 may be coupled to a network interface 409, such as provided by a Network Interface Controller (NIC) that is coupled to IHS 400. In certain embodiments, network interface 409 may be coupled to chipset 402 via PCIe bus 412. According to various embodiments, network interface 409 may also support communication over various wired and/or wireless networks and protocols (e.g., Wi-Fi, Bluetooth, etc.). In certain embodiments, chipset 402 may also provide access to one or more Universal Serial Bus (USB) ports 416.

Chipset 402 also provides access to one or more solid state storage devices 415 using PCIe bus interface connection 418. In certain embodiments, chipset 402 may also provide access to other types of storage devices. For instance, in addition to solid state storage device 415, IHS 400 may also utilize one or more magnetic disk storage devices, or other types of the storage devices such as an optical drive or a removable-media drive. In various embodiments, solid state storage device 415 may be integral to IHS 400, or may be located remotely from IHS 400.

Upon powering or restarting IHS 400, processor(s) 401 may utilize instructions stored in Basic Input/Output System (BIOS) or Unified Extensible Firmware Interface (UEFI) chip 417 to initialize and test hardware components coupled to IHS 400 and to load an Operating System (OS) for use by IHS 400. Generally speaking, BIOS 417 provides an abstraction layer that allows the OS to interface with certain hardware components that utilized by IHS 400. It is through this hardware abstraction layer that software executed by the processor(s) 401 of IHS 400 is able to interface with I/O devices that coupled to IHS 400.

In various embodiments, IHS 400 may not include each of the components shown in FIG. 4. Additionally or alternatively, IHS 400 may include various components in addition to those that are shown. Furthermore, some components that are represented as separately may, in other embodiments, be integrated with other components. For example, in various implementations, all or a portion of the functionality provided by the illustrated components may instead be provided by components integrated into the one or more processor(s) 401 as a system-on-a-chip (SOC) or the like.

Figure 5:
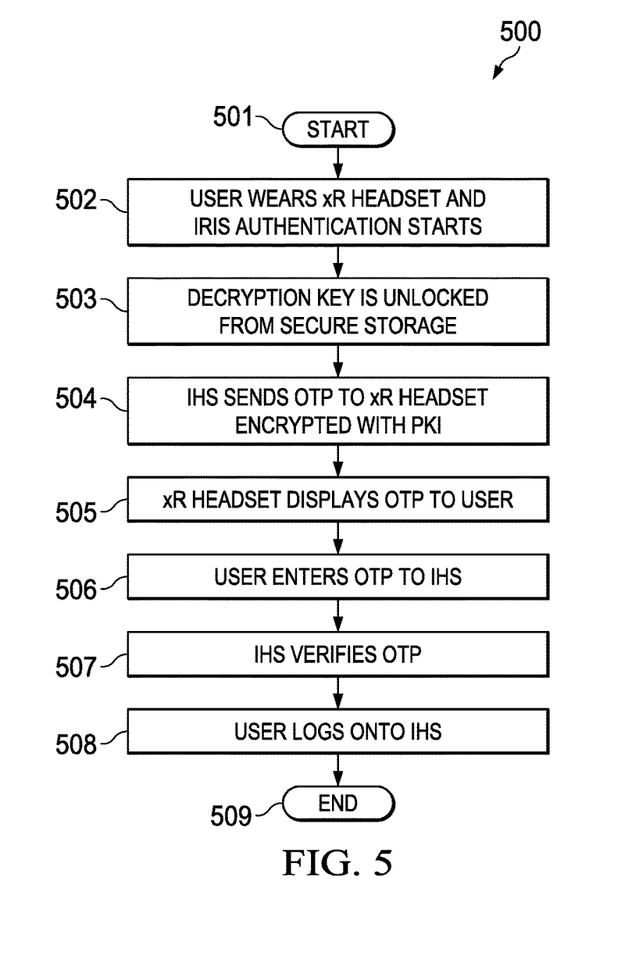
FIG. 5 is a flowchart of a non-limiting example of a method for multi-factor authentication in xR applications according to some embodiments.

FIG. 5 illustrates method 500 for multi-factor authentication in xR applications. In some embodiments, method 500 may be performed by xR headset 100 in communication with IHS 400. As shown, method 500 starts at block 501.

At block 502, a user wears xR headset 100 and a suitable biometric authentication process is performed, which enables the user to logon to the xR headset. For example, xR headset 100 may perform an iris authentication technique employing mathematical pattern-recognition techniques on video or still images of the user's iris. Additionally or alternatively, xR headset 100 may perform a retinal authentication process using an infrared (IR) or near-IR camera.

At block 503, in response to the first biometric authentication having been successful, a decryption key is unlocked from a secure portion of memory 304. As used herein, a "key" is a parameter or value that determines the output of a cryptographic algorithm. For encryption algorithms, an encryption key specifies a transformation of plaintext into ciphertext. Conversely, for decryption algorithms, a decryption key specifies a transformation of ciphertext into plaintext.

At block 504, IHS 400 sends a one-time password (OTP) encrypted using a public key, using asymmetric public key infrastructure (PKI) techniques, to xR headset 100. As used herein, an OTP is a password (e.g., an alphanumeric string) that is valid for only one login session or transaction. A PKI is a set of roles, policies, and procedures used to create, manage, distribute, use, store, and/or revoke digital certificates, and to manage asymmetric public/private-key encryption.

At block 505, xR headset 100 decrypts and presents the OTP to the user, for example, via display 200. Additionally or alternatively, xR headset 100 may play a sound to the user indicative of the OTP via a speaker. At block 506, the user enters the OTP into IHS 400, for example, using a keyboard, voice command, or the like. At block 507, IHS 400 verifies the OTP. In response to a successful verification, block 508 logs the user onto IHS 400, and method 500 ends at block 509.

By executing method 500, xR headset 100 becomes configured to: authenticate the user wearing it, and, in response to the authentication, log the user into IHS 400 distinct from xR headset 100. To log the user into IHS 400, xR headset 100 may receive an OTP from IHS 400. The OTP may be encrypted with a public key paired to the private key. As such, xR headset 100 may decrypt the OTP with the private key and use the OTP to log onto IHS 400.

In the foregoing example, it is assumed that the user wearing xR headset 100 wishes to log him or herself onto to IHS 400, and the process is initiated automatically in response to the xR headset authentication of block 502. In other embodiments, however, method 500 may be modified to accommodate different scenarios based on policies (e.g., in the form of an XML file or the like) that associate two or more users, two or more xR headsets, two or more IHSs, access restrictions for different users and/or devices, and/or one or more predetermined rules that enable those different logon scenarios.

For example, whether before or after the authentication of block 502, xR headset 100 may also receive an authentication request from IHS 400, retrieve a private key from the memory, and transmit a response to the authentication request, such that the response is encrypted with the private key.

Additionally or alternatively method 500 may authenticate a first user wearing xR headset 100 and, in response to the authentication of the first user, it may log a second user into IHS 400, as identified in an applicable policy. Additionally or alternatively, to authenticate the second user, method 400 may authenticate the first user in response to a request initiated by the second user operating IHS 400. Additionally or alternatively, to authenticate the second user, method 500 may cause xR headset 100 to perform a plurality of authentication operations upon the first user, and, upon failure of one of those operations, it may log the second user out of IHS 400.

Figure 6:
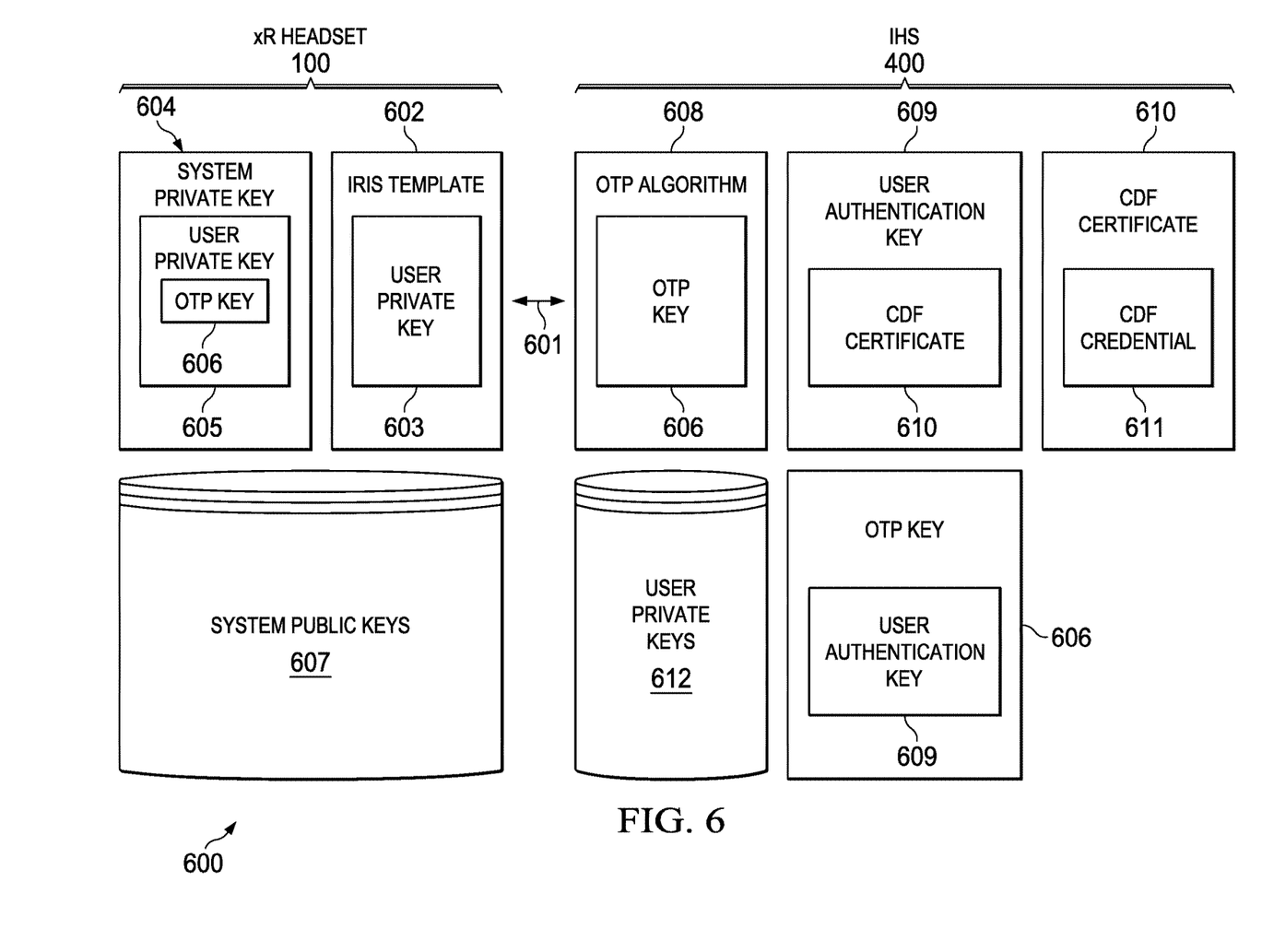
FIG. 6 is a block diagram of a non-limiting example of a system for multi-factor authentication in xR applications according to some embodiments.

FIG. 6 illustrates system 600 for multi-factor authentication in xR applications. In some embodiments, elements shown in system 600 may be used to perform method 500 of FIG. 5, as further explained in messaging diagram 700 of FIG. 7. As shown, the xR headset-side of system 600 includes iris template 602, which can be used at block 502 of method 500 to retrieve user private key 603 from memory. xR headset 100 also includes system private key 604 and user private key 605, which may be used at block 504 of method 500 to decrypt OTP 606. System 600 also includes system public keys in database 607.

In communication with xR headset 100 via channel 601 (e.g., a wireless Transport Layer Security (TLS) pipe established via connection 303), the IHS-side of system 600 includes OTP module or algorithm 608 for generating OTP 606 sent to xR headset 100 in encrypted form at block 504 of method 500. User private keys are stored in database 612. IHS 400 is also configured to retrieve user authentication key 609, which in turn may be used to retrieve Companion Device Framework (CDF) certificate 610. CDF certificate 610 is usable to retrieve CDF credential 611.

Figure 7:
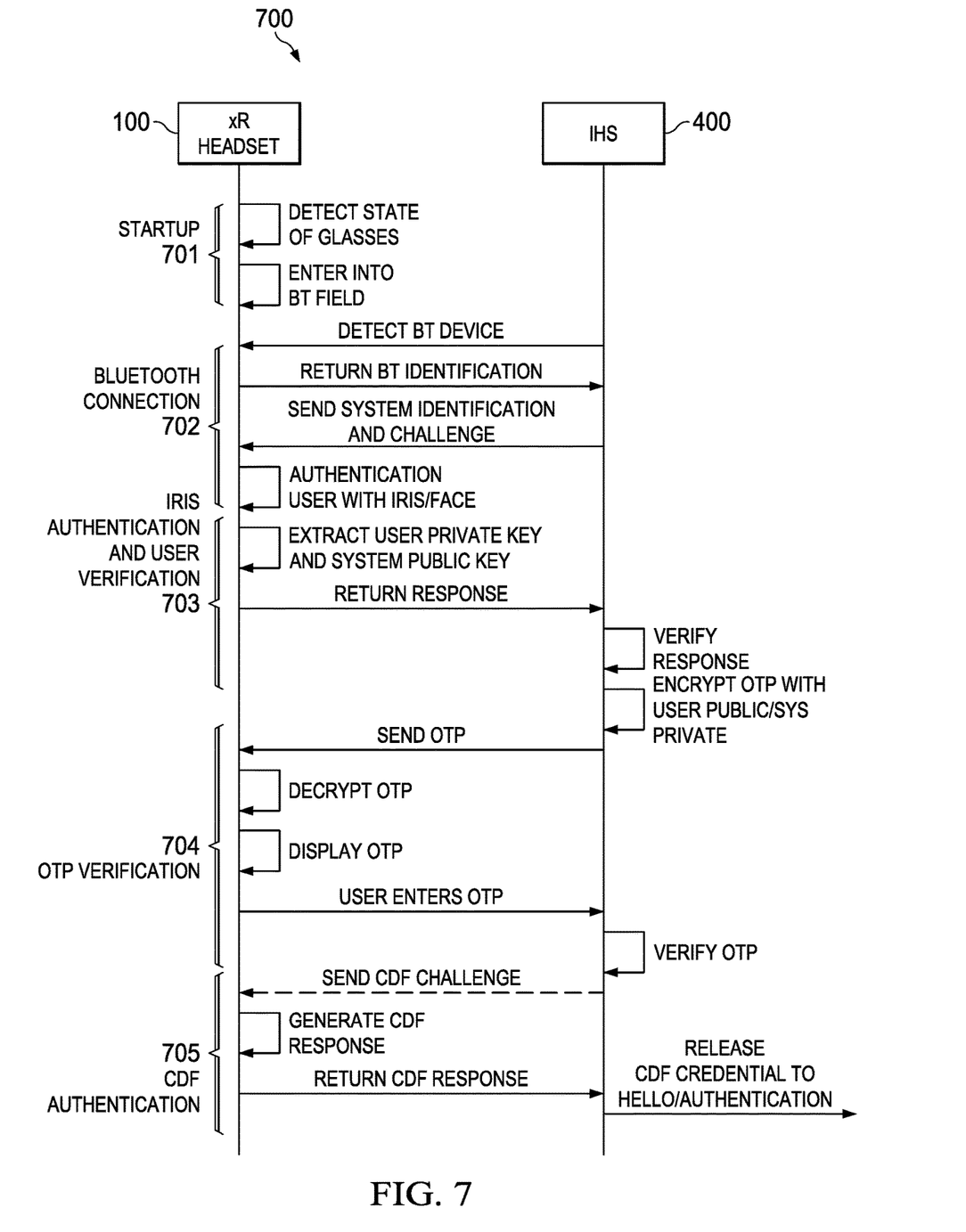
FIG. 7 is a message diagram of a non-limiting example of communications that implement multi-factor authentication in xR applications according to some embodiments.

FIG. 7 shows message diagram 700 for multi-factor authentication in xR applications between xR headset 100 and IHS 400. In various embodiments, messages 700 may implement one or more operations of method 500 using one or more components of system 600. As shown, a multi-factor authentication process may initiate with startup messages 701, whereby xR headset 100 detects its state (e.g., on, standby, etc.) and joins a wireless network (e.g., Bluetooth, WiFi, WiGig, etc.).

After startup messages 701, Bluetooth messages 702 (as a non-limiting example of a wireless connection) are exchanged between xR headset 100 and IHS 400. Particularly, IHS 400 detects xR headset 100 (or vice versa) as a Bluetooth device and xR headset 100 returns a Bluetooth ID to IHS 400, in response to which IHS 400 sends xR headset 100 a system (IHS) ID and a challenge.

In response to the challenge, xR headset 100 locally authenticates the user with biometric recognition (e.g., iris or retinal scan). After that, authentication and user verification messages 703 extract a user's private key and a system public key, and return a response to the challenge to IHS 400. Then, upon verifying the response, IHS generates and/or retrieves an OTP, encrypts the OTP with user's public key and/or the system private key, which may be matched to each other.

In the exchange of OTP verification messages 704, IHS 400 sends the OTP to xR headset 100, which decrypts the OTP and presents an indication of the OTP to the user via display 200, for example, so that only the user wearing xR headset 100 can see (or hear, in the case of an audio indication) the OTP. It should be noted that, in contrast with other OTP-based authentication techniques for conventional computing devices, systems and methods described herein may be implemented using a wearable device (in this case, xR headset 100) that is personal to a given user, and not shareable or accessible to other users in the physical vicinity of that given user, thus rendering the logon process much less prone to "spoofing." Only the user who can see the OTP can then present the OTP, an indication of the OTP, or any other information derivable from the OTP, to IHS 400.

CDF authentication messages 705 are then exchanged in response to IHS 400 successfully verifying the OTP provided by the user. Particularly, IHS 400 may send a CDF challenge to xR headset 100. xR headset 100 may generate a CDF response and return that response to IHS 400. After successful authentication of the CDF response, IHS 400 may log the user (or another user) onto IHS 400.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A headset, comprising:
 a processor; and
 a memory coupled to the processor, the memory comprising program instructions stored thereon that, upon execution, cause the headset to:
  authenticate a first user wearing the headset; and
  in response to the authentication, log a second user into a computing device distinct from the headset.

2. The headset of claim 1, wherein to authenticate the first user, the program instructions, upon execution, further cause the headset to match a biometric sample obtained from the first user against stored biometric information of the first user, wherein the biometric sample comprises at least one of an iris, a retina, or a fingerprint sample.

3. The headset of claim 1, wherein to log the second user into the computing device, the program instructions, upon execution, further cause the headset to:
 receive an authentication request from the computing device;
 retrieve a private key from the memory; and
 transmit a response to the authentication request, wherein the response is encrypted with the private key.

4. The headset of claim 1, wherein to log the second user into the computing device, the program instructions, upon execution, further cause the headset to:
 receive a One-Time Password (OTP) from the computing device, wherein the OTP is encrypted with a public key paired to the private key;
 decrypt the OTP using the private key; and log the second user into the computing device with the OTP.

5. The headset of claim 1, wherein the headset further comprises a display, and wherein to log the second user into the computing device, the program instructions, upon execution, further cause the headset to show an image to the second user indicative of the OTP via the display.

6. The headset of claim 1, wherein the headset further comprises a speaker, and wherein to log the second user into the computing device, the program instructions, upon execution, further cause the headset to play a sound to the first user indicative of the OTP via the speaker.

7. A hardware memory storage device having program instructions stored thereon that, upon execution by a processor of a headset, cause the headset to:
authenticate a first user wearing the headset; and
in response to the authentication, log a second user into a computing device distinct from the headset.

8. The hardware memory storage device of claim 7, wherein to authenticate the first user, the program instructions, upon execution, further cause the headset to match a biometric sample obtained from the first user against stored biometric information of the first user.

9. The hardware memory storage device of claim 7, wherein to log the second user into the computing device, the program instructions, upon execution, further cause the headset to:
receive an authentication request from the IHS computing device;
retrieve a private key from the memory;
transmit a response to the authentication request, wherein the response is encrypted with the private key;
receive a One-Time Password (OTP) from the computing device, wherein the OTP is encrypted with a public key paired to the private key; and
decrypt the OTP using the private key.

10. The hardware memory storage device of claim 7, wherein to authenticate the second user, the program instructions, upon execution, further cause the headset to: authenticate the first user in response to a request initiated by the second user operating the computing device.

11. The hardware memory storage device of claim 10, wherein to authenticate the second user, the program instructions, upon execution, further cause the headset to perform a plurality of authentication operations and, upon failure of at least one of the authentication operations, log the second user out of the computing device.

12. A method, comprising:
authenticating, by a headset, a first user wearing the headset; and
in response to the authentication, providing a second user with access to a computing device distinct from the headset.

13. The method claim 12, wherein authenticating further comprises matching a biometric sample obtained from the first user against stored biometric information of the first user, wherein the biometric sample comprises at least one of an iris, a retina, or a fingerprint sample.

14. The method of claim 12, wherein providing access to the computing device further comprises:
receiving an authentication request from the computing device;
retrieving a private key from the memory; and
transmitting a response to the authentication request, wherein the response is encrypted with the private key.

15. The method of claim 12, wherein providing access to the computing device further comprises:
receiving a One-Time Password (OTP) from the computing device, wherein the OTP is encrypted with a public key paired to the private key;
decrypting the OTP using the private key; and
logging the second user into the computing device with the OTP.

16. The method of claim 12, wherein providing access to the computing device further comprises:
receiving a One-Time Password (OTP) from the computing device, wherein the OTP is encrypted with a public key paired with the private key;
decrypting the OTP using the private key; and
logging another user into the computing device with the OTP.

17. The method of claim 12, wherein the headset includes a display, and wherein providing access to the computing device further comprises causing the headset to show an image to the first user indicative of the OTP via the display.

18. The method of claim 12, wherein the headset includes a speaker, and wherein providing access to the computing device further comprises causing the headset to play a sound to the first user indicative of the OTP via the speaker.

19. The headset of claim 1, wherein the computing device comprises at least one of a desktop computer, a laptop computer, a notebook computer, a tablet computer, a personal digital assistant (PDA), a smart phone, a blade server, or a rack server.

20. The method of claim 12, wherein the computing device comprises at least one of a desktop computer, a laptop computer, a notebook computer, a tablet computer, a personal digital assistant (PDA), a smart phone, a blade server, or a rack server.

* * * * *